United States Patent [19]

Landry et al.

[11] Patent Number: 5,137,321
[45] Date of Patent: Aug. 11, 1992

[54] MOBILE OFFICE VAN CONVERSION

[76] Inventors: George H. Landry, 4669 Pardee, Dearborn Heights, Mich. 48125; Ronald W. Bush, 133 Mannor Way, Rochester Hills, Mich. 48309

[21] Appl. No.: 621,597

[22] Filed: Dec. 4, 1990

[51] Int. Cl.⁵ ............................................. B60P 3/025
[52] U.S. Cl. .................................................... 296/24.1
[58] Field of Search ..................... 296/24.1, 65.1; 29/401.1

[56] References Cited

U.S. PATENT DOCUMENTS 3,946,678  3/1976  Birge et al. .................. 296/65.1 X Primary Examiner—Johnny D. Cherry
Assistant Examiner—Andrew C. Pike
Attorney, Agent, or Firm—John R. Benefiel

[57] ABSTRACT

A van conversion for converting the cargo space into a mobile office, the conversion is disclosed including an L-shaped desk unit fit into the cargo space and clamped to the van floor by mechanisms carried by a platform forming the bottom of the structure. An L-shaped top extends across the rear and forwardly up one side of the space, with a pivoting seat mounted within the corner space. Hinged computer and facsimile machines are storable in a rear cabinet supporting the top on the platform, with an additional cabinet beneath the top at the forward end of the side portion of the top.

14 Claims, 4 Drawing Sheets

MOBILE OFFICE VAN CONVERSION

BACKGROUND OF THE INVENTION

This invention concerns conversion of so called minivan vehicles to provide a mobile office space. Such vehicles are provided with a large space to the rear of the driver and front passenger seats together with a tail gate rear door and a large sliding side door on the passenger side of the van such that a large volume, easily accessible space is a feature of these vehicles. The cargo space is typically provided with 1 or 2 rows of removable seats to allow either increased passenger carrying capacity, or with the seats removed, a large cargo hauling capacity.

There has heretofore been provided various van conversions for installing tables and other equipment in the cargo space for such purposes as camping, which conversion increases the usefulness of the vehicle.

There is a need for mobile office space by persons engaged in businesses which require extensive on the road activity, such as real estate appraisers, salesmen, manufacturers' representatives, etc. who call on numerous customers at widely separated locations. Such individuals typically have extensive paperwork associated with their jobs requiring them to return to an office, which is also where communications are received.

The necessity of maintaining an office at a fixed location adds significantly to travel time, as well as adding substantial overhead expense to the business.

There has not heretofore been provided a van conversion allowing effective use of the van cargo space as a mobile office.

Any conversion should preferably allow the van to be restored to its passenger carrying or other configurations to enable maximum utility to be made of the vehicle.

SUMMARY OF THE INVENTION

The present invention comprises a van conversion for providing an efficiently usable mobile office space within the passenger-cargo space of a van type vehicle. The conversion includes a unitary desk unit installed through the rear door or doors and locked to the seat anchors of the rear rows of seats removed prior to making the conversion. The desk unit comprises an L-shaped planar top member supported on a generally L-shaped platform base by a pair of cabinets resting on and fixed to the platform, with the top attached to the cabinets.

The desk unit is mounted within the van with one rear portion of the L-shape extending across the rear of the van cargo space, and a side portion extending forwardly along the driver's side of the van space, opposite the sliding side door.

The rear cabinet contains drawers facing the rear door, accessible through the rear door opening, while the other cabinet has drawers facing the side door at the forward end of the side portion.

Preferably a narrow storage space is provided between the desk unit and either side wall of the van. The storage space also allows easy routing of power and phone cables to facsimile and computer storage spaces within the rear cabinet located just forward of the drawers.

A portable computer and facsimile machine are stored in the storage spaces beneath flush hinged doors recessed into the desk unit top within the rear leg portion thereof. These machines are fixed to holder bases each slidable up from a storage cavity beneath the top, and hinged to be rotated forwardly onto the top. The office machines when deployed face a seat installed on the van floor in an open area formed by the intersection of the rear and side portions of the desk unit.

Both the computer and facsimile machines are easily detached for convenient removal to be taken out of vehicle storage or use.

Power and telephone lines are routed to an enclosed compartment below the computer and facsimile machines for connections to the computer and facsimile machine.

A switched light is preferably supported above the side portion next to a telephone handset installed on the top.

The platform base is latched by mechanisms cooperating with existing seat floor anchors welded into the vehicle floor pan.

DETAILED DESCRIPTION

Figure 1A:
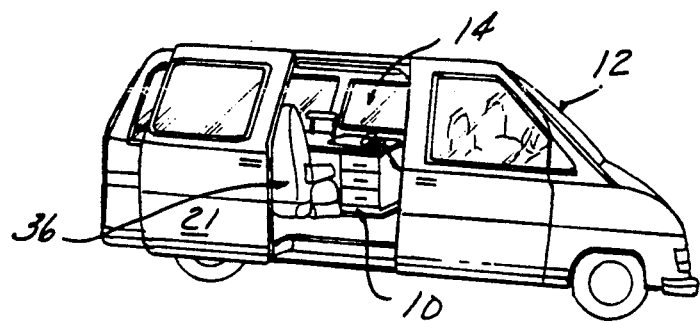
FIG. 1A is a diagrammatic side view of a typical van showing an opened side door.
Figure 1:
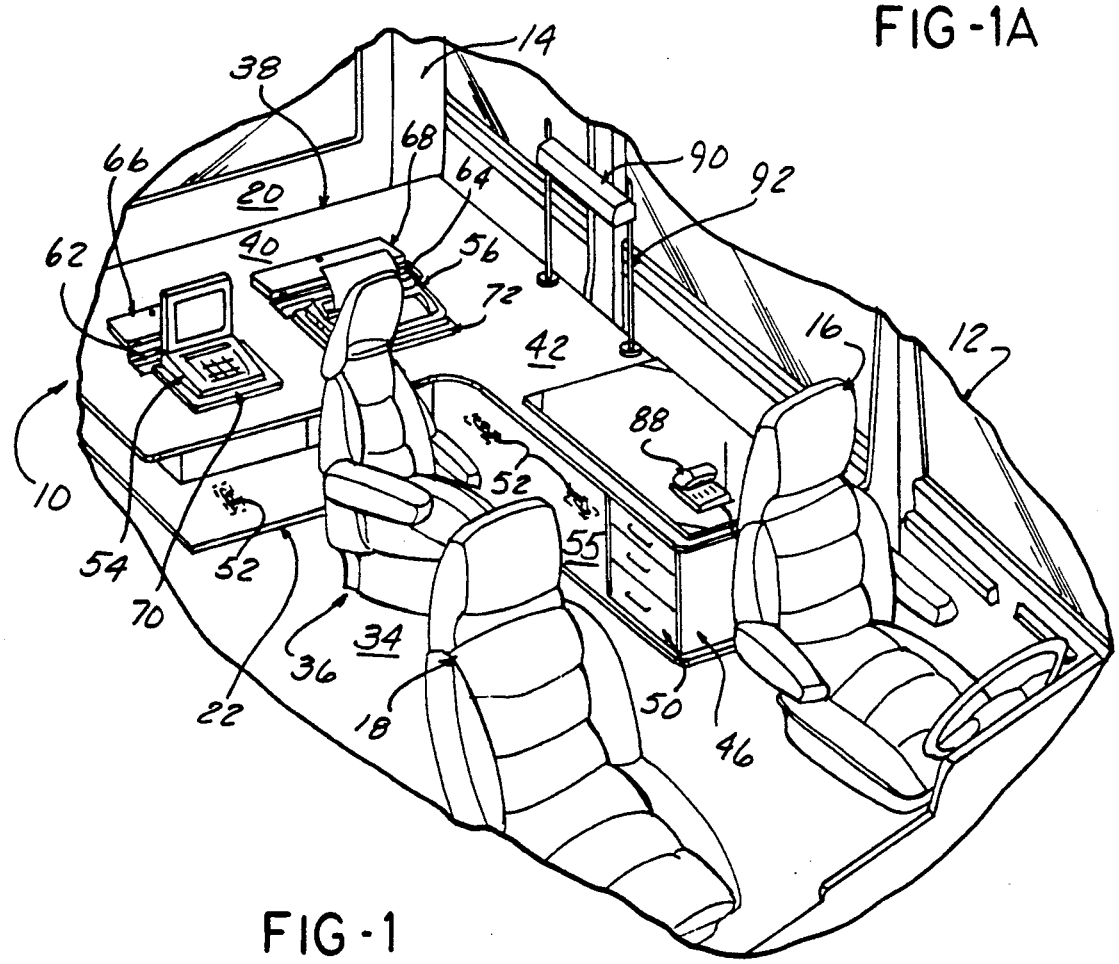
FIG. 1 is a perspective fragmentary view of the interior of a van having a desk unit installed therein, looking down from a point forward of the van cargo space on the passenger side of the van.
Figure 2:
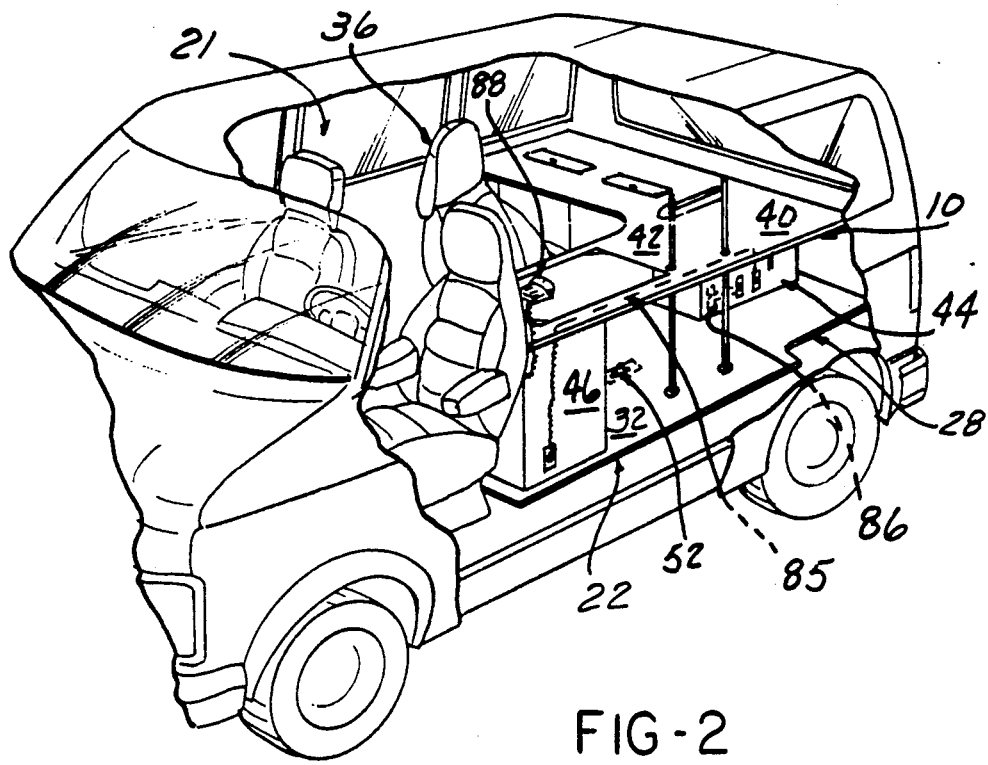
FIG. 2 is a broken away a perspective view of the van, looking down from a point on the driver side of the van.
Figure 3:
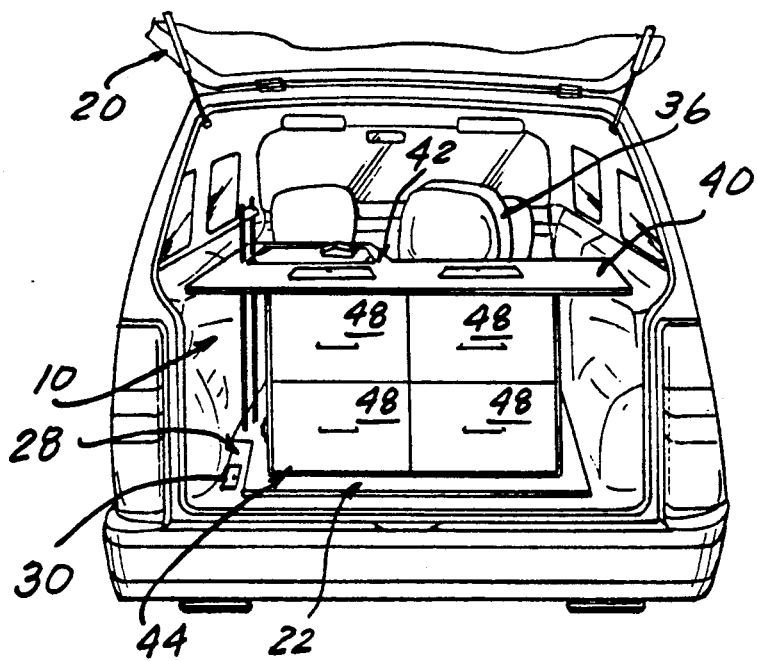
FIG. 3 is a perspective view of the converted van shown in FIGS. 1 and 2, looking into the rear tailgate opening of the van.
Figure 4:
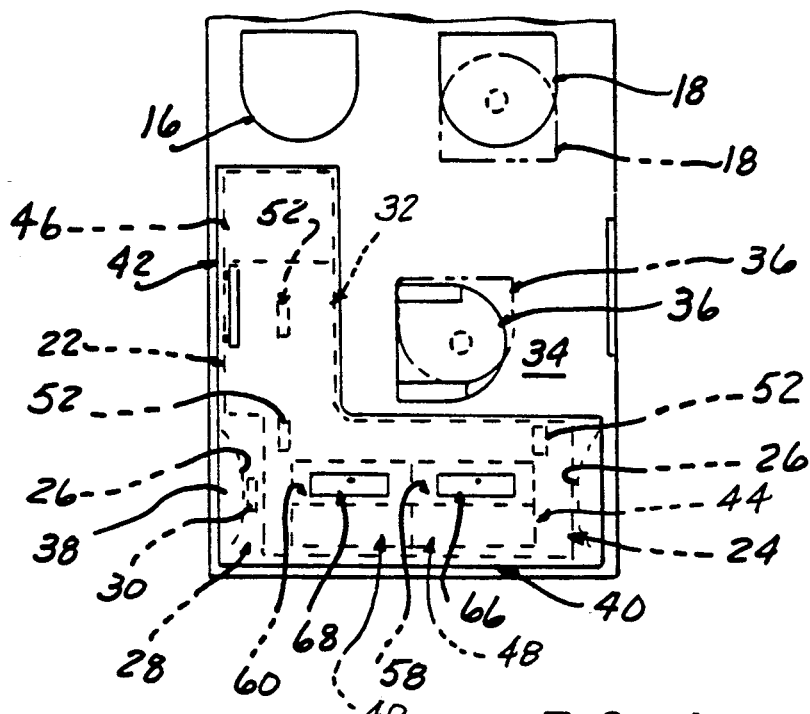
FIG. 4 is a plan view of the work structure insert with a phantom line depiction of the pivoting desk and passenger seat movement.
Figure 5:
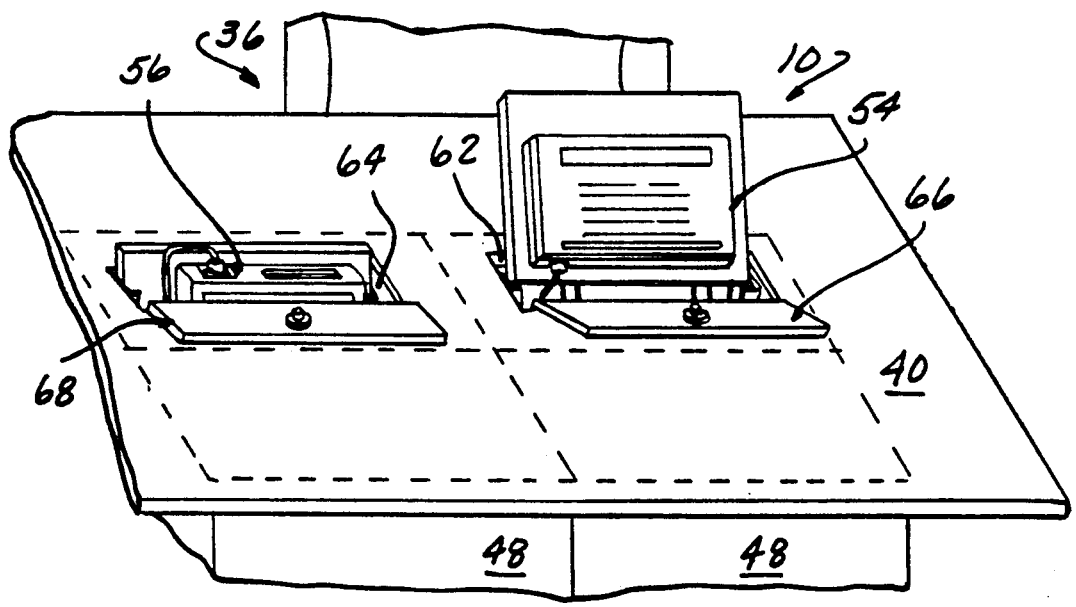
FIG. 5 is a perspective view of a partially deployed computer and facsimile machine raised up from storage cavities in the desk unit.

In the following detailed description, certain specific terminology will be employed for the sake of clarity and a particular embodiment described in accordance with the requirements of 35 USC 112, but it is to be understood that the same is not intended to be limiting as the invention is capable of taking many forms and variations within the scope of the appended claims.

Referring to the Drawings and particularly FIGS. 1-4, the van conversion according to the present invention includes a desk unit 10 installed in the cargo space 14 of a van type vehicle 12, cargo space 14 located to the rear of the driver's seat 16.

Typical van type vehicles have either a pair of hinged doors, or a single tailgate door 20, as shown, mounted to be swung up to enable access to the cargo space 14 from the rear. Vans usually also have a sliding side door 21 enabling access to the cargo space 14 through the passenger side of the vehicle 12 (FIG. 1A).

The desk unit 10 is configured so as to be able to be installed in the cargo space 14 through the opening created by opening of the rear door or doors 20, and includes a generally L-shaped platform 22. The L-shape is created by a rear portion 24 thereof extending across the width of the cargo space 12 and of a lesser dimension than the distance between the vehicle wheel wells 26 to enable sliding therebetween. A cutout 28 may be provided for access to a maintenance opening closure 30 in the floor of the vehicle within the cargo space 14.

A side portion 32 integral with the rear portion 24 extends forwardly from the left hand or driver's side of the platform 22 to a point just to the rear of the driver's seat 16 to complete the L-shape.

The corner space 34 partially bounded by the rear and side portions 24, 32 provides an open floor area for mounting a pivotal desk seat 36, located to face either the right side of side portion 32 or the forward side of the rear portion 24. The seat 36 can be moved by being rotated so that it could face the front as an extra passenger seat. The passenger front seat may also be moved by being pivoted through 180° so as to face the seat 36, enabling face to face positioning of persons in these seats, as may be desirable for normal positioning of occupants for interviews, consultations, etc.

An L-shaped planar top member 38 overlies the platform 22 in general correspondence therewith, supported at a height for convenient use as a desk by a person in the desk seat 36. The top 38 also includes a rear portion 40 extending across the vehicle width, dimensioned to lie over the wheel wells 26 and occupy the full available width of the cargo space 14 at the height at which it lies.

An integral side portion 42 extends from the left, driver's side of the rear portion, forwardly to a point just to the rear of the driver's seat 16.

The top 38 is supported by a rear cabinet 44, fixed atop the rear portion 24 of the platform 22 and beneath the rear portion 40 of the top 38; and, by a forward cabinet 46 fixed to the forward area of the side portion 32 of the platform 22 and beneath the side portion 42 of the top 38. A knee well space 55 is located between the cabinets 44, 46 aligned with the desk seat 36.

The platform 22, top 38, and cabinets 44, 46 form the unitary desk unit 10 which may be installed through the rear door opening.

The rear cabinet 44 has side by side pairs of rear facing storage drawers 48, while the forward cabinet 46 has stacked drawers 50 facing the side door 21.

The desk unit 10 is anchored by three locking mechanisms 52 mounted on the platform 22 and aligned with the existing seat anchors to allow convenient locking to the seat anchors, and easy release preparatory to removal of the desk unit 10.

A pair of office machines are contemplated as being stored beneath the top 38 for ready disposition on the rear portion 40 of the top surface facing the seat 36 for convenient use. These machines most advantageously comprise a portable, battery powered computer 54 and a facsimile machine 56, which are stored in storage cavities 58, 60 in the rear cabinet 44, just forward of the rear drawers 48.

Openings 62, 64 in the top 38 are aligned over the storage cavities 58, 60, closed off by hinged trap doors 66, 68, flush with the surface of the top 38 when closed.

The computer 54 and facsimile machine 56 are each mounted on a respective holder base 70, 72.

Figure 6B:
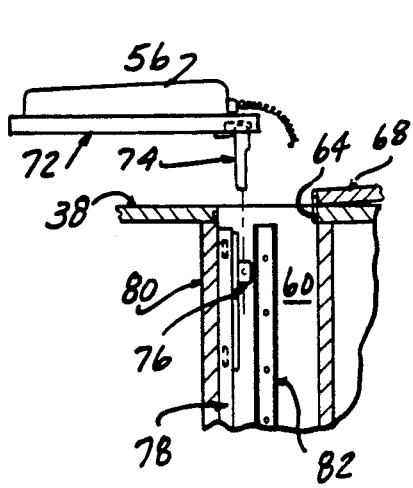
FIG. 6B is a fragmentary side elevational view of the facsimile machine storage compartment showing the facsimile machine detached for removal from the vehicle.
Figure 6A:
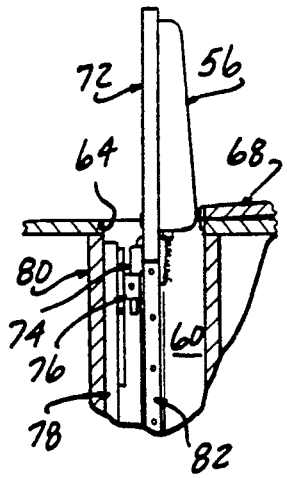
FIG. 6A is a fragmentary side elevational view of the facsimile machine storage compartment, with the facsimile machine being moved to the deployed position atop the desk unit top.
Figure 6:
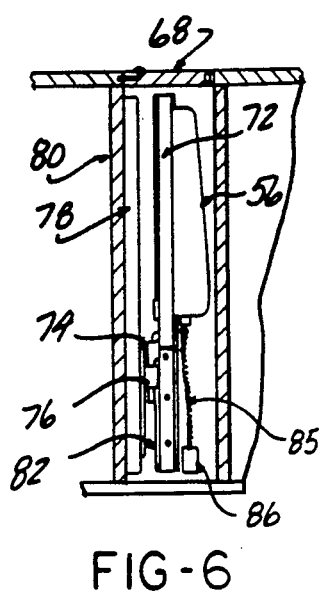
FIG. 6 is a fragmentary side elevational view of a facsimile machine storage compartment depicting the facsimile machine in the stowed condition.

FIG. 6-6B illustrate the mounting of the facsimile machine 56, which is the same as for the computer 54.

The holder base 72 is mounted to a pair of hinges 74 detachably mounted to a slider 76 supported for sliding movement in a pair of forward channel guides 78 fixed to the forward panel 80 defining the one side of the storage cavities 60 and the rear cabinet 44. Opposing side guide channels 82 receive the edges of the base holder 72 to guide movement up and down within the storage cavity 60.

The hinges 74 allow the base holder 72 to be rotated after exiting through the opening 64 so as to be swung down and disposed flat on the top 38 for use by a person in the seat 36.

Alternatively, the hinges 74 are detachable from the slider 76 to allow the holder base 72 and attached facsimile machine 56 to be completely removed.

Suitable hardware to provide these functions is commercially available as cabinet pocket door hardware systems from Julius Blum, Inc., Lowesville Stanley, N.C. and hence a detailed description of these components is not here set out. The hinges 74 are mounted in a reversed position from that in the cabinet door installation so as to allow the outward rotation of the holder base 72.

Also, the side guide channels 82 may be employed instead of guide rollers as typically employed in cabinet pocket door systems.

Power for the facsimile machine is routed along wiring 85 to the storage cavity 60 which may also house an dc to ac converter 86 located at the bottom of the cavity 60. A telephone line is also routed to the facsimile machine from an on-board cellular phone unit 88.

An overhead lamp 90 is supported on stanchions 92, preferably a fluorescent type bulb utilized, capable of illuminating the entire top 38.

Figure 7:
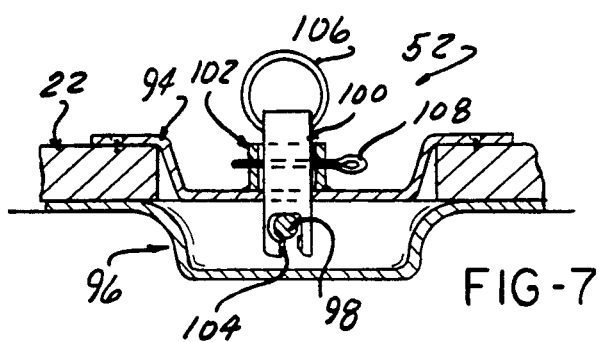
FIG. 7 is a sectional view of a bottom platform latching mechanism, shown latched to the seat anchor.
Figures 8, 9:
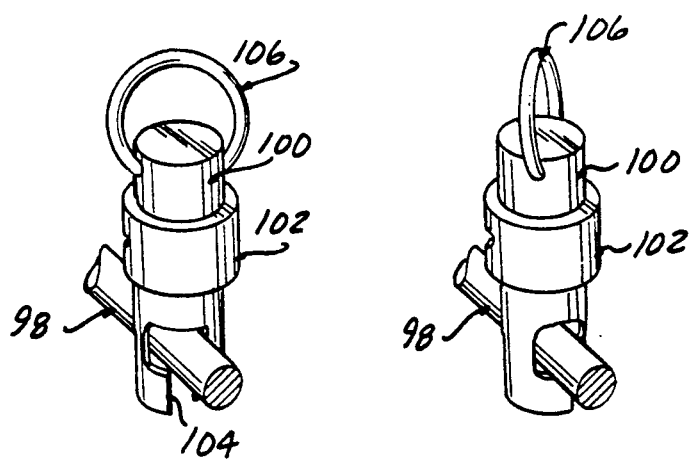
FIG. 8 is a perspective view of the locking pin of FIG. 7 and seat anchor pin in the inserted but unlocked position.
FIG. 9 is a perspective view of the locking pin of FIG. 7 shown rotated to the locked position.

FIGS. 7-9 show details of a suitable latching mechanism 52, including a metal insert 94 recessed into the platform 22, each aligned with a seat anchor 96 welded to the vehicle floor pan.

A locking rod 98 fixed to the seat anchor 96 is engageable with a slotted pin 100 slidable in a tube 102 welded to the insert 94. A slot 104 is angled to allow a bayonet connection by rotation of the pin 100, facilitated by a ring 106. A cotter pin 108 passing through the tube 102 and pin 100 secures the pin 100 in the locked position.

The desk unit 10 may be constructed as typical cabinets, of plywood or particle board, covered with a suitable durable laminate surface in the manner well known to those skilled in the art.

We claim:

1. A van conversion desk unit for providing a mobile office in a cargo space of a van vehicle, said cargo space having seat anchors in a floor of said van vehicle, and a rear and a side door, said van conversion desk unit including an insert desk unit comprising:

a generally L-shaped platform having a side to side extending rear portion and a forwardly extending side portion connected together to form said L-shape;

a generally L-shaped top member having generally corresponding rear and side portions disposed over and aligned with said rear and side portions of said platform;

an interposed support between each of the rear and the side portions of said platform and said top member, fixed to both said platform and said top member to form a unitary structure; and latching means for releasably connecting said platform to said seat anchors in the floor of said van vehicle, whereby said van conversion desk unit is releasably mounted within said cargo space.

2. The van conversion desk unit according to claim 1 wherein said van vehicle cargo space has wheel wells on either side thereof narrowing a side-to-side dimension of said cargo space, and wherein said platform rear portion is of a dimension substantially the same as a dimension between said wheel wells, and said top member rear portion is located above and extends over said wheel wells.

3. The van conversion desk unit according to claim 1 wherein said interposed support includes at least one cabinet, beneath said rear portion of said top member and on said platform rear portion, having storage drawers facing rearwardly from said van vehicle storage space.

4. The van conversion desk unit according to claim 3 wherein said top member has an upper horizontal surface and further including at least one office machine, and means for storing said office machine beneath said top member so as to be selectively raisable through an opening in said top member and lowered onto said upper horizontal surface of said top member adjacent said opening.

5. The van conversion desk unit according to claim 4 wherein a pair of office machines including a computer and a facsimile machine are included, as well as means for storing said facsimile machine and said computer beneath said top member so as to be selectively raisable onto the surface of said top member.

6. The van conversion desk unit according to claim 5 wherein said computer and facsimile machine are located side by side across said rear portion of the top member of said van conversion desk unit.

7. The van conversion desk unit according to claim 4 further including a holder base to which said office machine is attached, guide means mounted in said at least one cabinet extending to said opening in said top member, a slider member slidably mounted in said guide means, and hinge means pivotally attaching said holder base to said slider member to allow said holder base to be swung down onto said top member after exiting said top member opening.

8. The van conversion desk unit according to claim 7 wherein said hinge means allows selective detachment of said holder base from said slider member to enable removal of said office machine.

9. The van conversion desk unit according to claim 7 further including a trap door normally covering said top member opening.

10. The van conversion desk unit according to claim 1 further including a movably mounted desk seat mounted in a space within a corner formed by said rear and side portions of said platform of said van conversion desk unit.

11. The van conversion desk unit according to claim 10 further including a passenger seat mounted forward of said desk seat, said passenger seat movable so as to allow facing of said passenger seat forwardly or rearwardly towards said desk seat.

12. The van conversion desk unit according to claim 10 wherein said interposed support comprises a pair of cabinets, one cabinet located in between said top member and said platform rear portion, wherein said platform side portion has a forward end and wherein the other of said pair of cabinets is located between said top member and said platform side portion at said forward end of said platform side portion.

13. The van conversion desk unit according to claim 12 wherein said one cabinet has rear facing storage drawers therein and said other cabinet has storage drawers facing said side door, with a knee well space between said cabinets aligned with said movably mounted desk seat.

14. The van conversion desk unit according to claim 1 further including an electric light supported above said top member so as to illuminate said top member.

* * * * *